United States Patent
Elson et al.

(10) Patent No.: US 8,209,741 B2
(45) Date of Patent: Jun. 26, 2012

(54) HUMAN PERFORMANCE IN HUMAN INTERACTIVE PROOFS USING PARTIAL CREDIT

(75) Inventors: Jeremy Eric Elson, Kirkland, WA (US); Jonathan Ryan Howell, Seattle, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 11/856,362

(22) Filed: Sep. 17, 2007

(65) Prior Publication Data
US 2009/0077628 A1    Mar. 19, 2009

(51) Int. Cl.
G06F 7/04 (2006.01)
(52) U.S. Cl. .......................................................... 726/2
(58) Field of Classification Search ........................ 726/2
See application file for complete search history.

(56) References Cited

U.S. PATENT DOCUMENTS

| | | | |
|---|---|---|---|
| 6,195,698 B1 * | 2/2001 | Lillibridge et al. ........... | 709/225 |
| 7,200,576 B2 | 4/2007 | Steeves et al. | |
| 7,450,591 B2 | 11/2008 | Korling et al. | |
| 7,606,918 B2 | 10/2009 | Holzman et al. | |
| 7,680,891 B1 * | 3/2010 | Pongsajapan ................. | 709/206 |
| 7,760,641 B2 | 7/2010 | Gilfix | |
| 7,891,005 B1 * | 2/2011 | Baluja et al. .................... | 726/26 |
| 2002/0026478 A1 | 2/2002 | Rodgers et al. | |
| 2002/0108046 A1 | 8/2002 | Armingaud | |
| 2003/0191964 A1 | 10/2003 | Satyavolu et al. | |
| 2004/0199597 A1 | 10/2004 | Libbey et al. | |
| 2004/0254793 A1 * | 12/2004 | Herley et al. ................... | 704/270 |
| 2005/0065802 A1 | 3/2005 | Rui et al. | |
| 2005/0066201 A1 * | 3/2005 | Goodman et al. ............ | 713/202 |
| 2005/0120201 A1 | 6/2005 | Benaloh et al. | |
| 2005/0144067 A1 * | 6/2005 | Farahat et al. .................. | 705/14 |
| 2005/0246775 A1 | 11/2005 | Chellapilla et al. | |
| 2005/0289645 A1 * | 12/2005 | Hori .................................. | 726/7 |
| 2006/0095578 A1 | 5/2006 | Paya et al. | |
| 2006/0250962 A1 | 11/2006 | Chikamatsu | |
| 2006/0274779 A1 | 12/2006 | Shoham | |
| 2007/0019543 A1 | 1/2007 | Wei et al. | |
| 2007/0026372 A1 | 2/2007 | Huelsbergen | |
| 2007/0101010 A1 | 5/2007 | Ellison et al. | |
| 2007/0143624 A1 | 6/2007 | Steeves | |
| 2007/0153697 A1 | 7/2007 | Kwan et al. | |
| 2008/0063276 A1 * | 3/2008 | Vincent et al. ................ | 382/182 |
| 2008/0133321 A1 | 6/2008 | Pennock et al. | |
| 2009/0076965 A1 * | 3/2009 | Elson et al. ..................... | 705/55 |

OTHER PUBLICATIONS

Luis von Ahn, et al. How lazy cryptographers do AI. Feb. 2004. http://www.captcha.net/captcha_cacm.pdf.
Monica Chew, et al. BaffleText: a Human Interactive Proof. Jul. 5, 2007. http://www.gbtn.org/~chlee/research/phishing/baffle_text.pdf.

(Continued)

Primary Examiner — Kambiz Zand
Assistant Examiner — Teshome Hailu

(57) ABSTRACT

A system and method that facilitates and effectuates distinguishing a human from a non-human user. A human interactive proof (HIP) employs a partial credit algorithm in order to allow a user to make one or more mistakes during consecutive HIP challenges and still be identified as a human. The algorithm assigns a user partial credit based upon getting part of the challenge incorrect. The partial credit is tracked and if during one or more consecutive subsequent challenges the same user gets a portion of the challenge incorrect again, they can still be identified as human.

23 Claims, 12 Drawing Sheets

OTHER PUBLICATIONS

Pablo Ximenes, et al. A Proposal of Human Interactive Proof in the Text Domain. Jul. 5, 2007. http://www.ppgia.pucpr.br/~maziero/pesquisa/ceseg/sbseg05/artigos/12714.pdf.

Yong Rui, et al. Excuse Me, But Are You Human? Nov. 2, 2003. http://delivery.acm.org/10.1145/960000/957113/p462-rui.pdf?key1=957113&key2=0812263811&coll=GUIDE&dl=GUIDE&CFID=23098507&CFTOKEN=47300983.

Kumar Chellapilla, et al. Using Machine Learning to Break Visual Human Interaction Proofs (HIPs). Jul. 5, 2007. http://research.microsoft.com/~kumar/pubs/chellapilla_nips04.pdf.

OA dated May 26, 2010 for U.S. Appl. No. 11/856,367, 39 pages.

Non-Final OA dated Jul. 21, 2010 for U.S. Appl. No. 11/856,371, 22 pages.

Non-Final OA dated Dec. 27, 2010 for U.S. Appl. No. 11/856,367, 44 pages.

OA dated Jan. 5, 2011 for U.S. Appl. No. 11/856,371, 16 pages.

OA dated Apr. 29, 2011 for U.S. Appl. No. 11/856,371, 18 pages.

Non-Final OA dated May 27, 2011 for U.S. Appl. No. 11/856,367, 43 pages.

\* cited by examiner

HUMAN PERFORMANCE IN HUMAN INTERACTIVE PROOFS USING PARTIAL CREDIT

BACKGROUND

There are many Internet or web based services that have a need to distinguish between a human and a computer user interacting with the service. For example, there are many free e-mails services that allow a user to create an e-mail account by merely entering some basic information. The user is then able to use the e-mail account to send and receive e-mails. This ease of establishing e-mail accounts has allowed spammers to produce computer programs to automatically create e-mail accounts with randomly generated account information and then employ the accounts to send out thousands of spam e-mails. Web services have increasingly employed Turing test challenges (commonly known as a Completely Automated Public Turing test to tell Computers and Humans Apart (CAPTCHA™) or Human Interactive Proof (HIP)) in order to distinguish between a human and a computer as the user of the web service. The web service will only allow the user to employ the service after the user has passed the HIP.

The HIP is designed so that a computer program would have difficulty passing the test, but a human can more easily pass the test. All HIPs rely on some secret information that is known to the challenger but not to the user being challenged. HIPs or CAPTCHAs™ can be divided into two classes depending on the scope of this secret. In what are herein referred to as Class I CAPTCHAs™, the secret is merely a random number, which is fed into a publicly known algorithm to yield a challenge. Class II CAPTCHAs™ employ both a secret random input and a secret high-entropy database. A critical problem in building a Class II CAPTCHA™ is populating the database with a sufficiently large set of classified, high-entropy entries.

Class I CAPTCHAs™ have many virtues. They can be concisely described in a small amount of software code; they have no long term secret that requires guarding; and they can generate a practically unbounded set of unique challenges. On the other hand, their most common realization, a challenge to recognize distorted text, evinces a disturbingly narrow gap between human and nonhuman success rates. FIG. 2A shows an example of a simple class 1 CAPTCHA™ displaying a random text string. The figure shows clearly segmented characters. Optical character recognition algorithms are competitive with humans in recognizing distinct characters, which has led researchers toward increasing the difficulty of segmenting an image into distinct character regions. FIGS. 2B through 2E show common ways in which class I CAPTCHAs™ are modified in an attempt to make it more difficult for a computer program to correctly recognize the characters. The text string can be distorted and noise can be added when rendered for display to a user. However, this increase in difficulty affects humans as well. The owners of web services must be careful to not make the challenge so difficult that it drives away real human users from expending the effort to user their service. Even relatively simple challenges can drive away a substantial number of potential customers.

Class II CAPTCHAs™ have the potential to overcome the main weaknesses described above. Because they are not restricted to challenges that can be generated by a low-entropy algorithm, they can exercise a much broader range of human ability, such as recognizing features of photographic images captured from the physical world. Such challenges evince a broad gulf between human and non-human success rates, not only because general machine vision is a much harder problem than text recognition, but also because image-based challenges can be made less bothersome to humans without drastically degrading their efficacy at blocking automatons.

An issue that can arise with both Class I and II CAPTCHAs™ is a human having difficulty solving the entire challenge correctly. For example, in the case of a Class I CAPTCHA™ distortions, convolutions, or noise that have been added to a text based challenge can make it difficult for a human user to correctly identify each character. The user may get all but one of the characters correct, such as mistaking the letter "e" for "c". Similarly for a Class II CAPTCHA™ a human user may be able to correctly classify most of the images, but may get one or more images incorrect. For example, if the challenge requires classifying images as cat or dog, pictures of younger cats and dogs may be harder classify. If a human user is failed the challenge on a first attempt for getting one wrong and tries again and fails again for getting one wrong, the human user may stop trying, thereby causing the site being secured by the CAPTCHA™ to lose a real human customer. Suppose that CAPTCHA™ challenges were scored manually, by a human judge, instead of automatically by computer. Even in this seemingly straight-forward task, the flexibility of human judgment would be a valuable asset. For example, a human judge may see the same user try to solve three challenges, getting 11 out of 12 images correct each time. The judge might say, "That looks like a human who is just having a little trouble. I'll let the user pass." There is a need for an automated approach to allow for a human user to make mistakes and still be able to pass the CAPTCHA™, while still making it difficult for a non-human to pass.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

In accordance with one or more aspects and corresponding disclosure thereof, various features are described in connection with a HIP for distinguishing a human from a non-human. In one aspect, a HIP service employs Class I or II CAPTCHAs™ as part of its Turing test challenge. The HIP service gives a user taking the challenge partial credit if the user gets part of the challenge wrong and employs this partial credit in a subsequent challenge attempt by the user in order to determine if the user is human or non-human. The HIP service can be a web based service or an installable application used to secure an Internet, intranet, or non-networked computer application from use by an automated computer representing itself as a human. Some examples of computer programs that would employ the HIP service are, but are not limited to: a free e-mail service trying to avoid e-mail spammers from creating accounts, an event ticket seller limiting scalpers from buying large quantities of tickets, a web blog wanting to prevent automated postings from marketers or vandals, a domain name registrar preventing cyber squatters from buying large quantities of domain names that are variations of legitimate domain names; a free networked data storage site restricting account creation for storage of pirated copyrighted material; and a website trying to prevent a denial of service attack.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
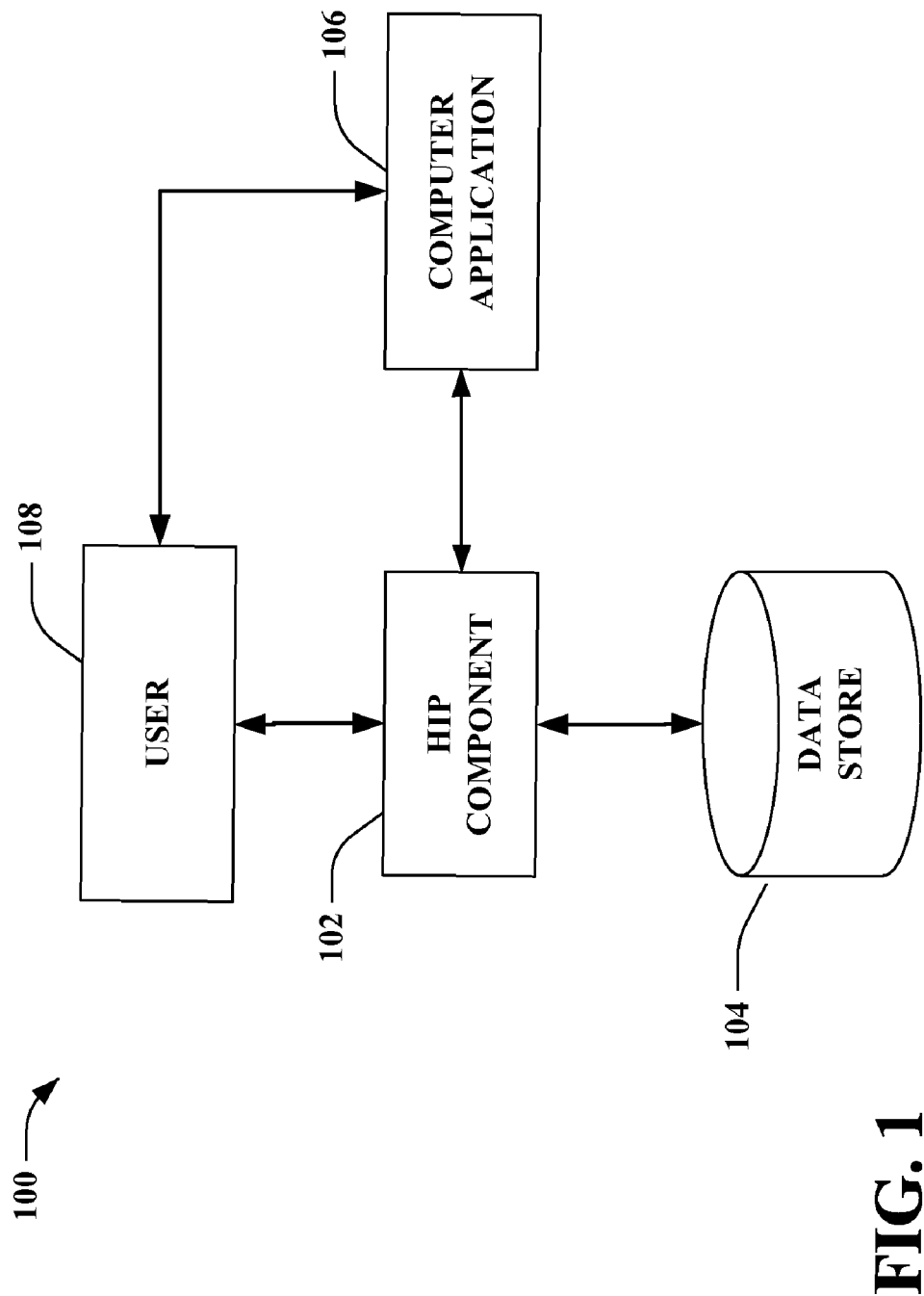
FIG. 1 illustrates a general block diagram HIP system employing partial credit to distinguish between human and non-human users.
Figure 2A:
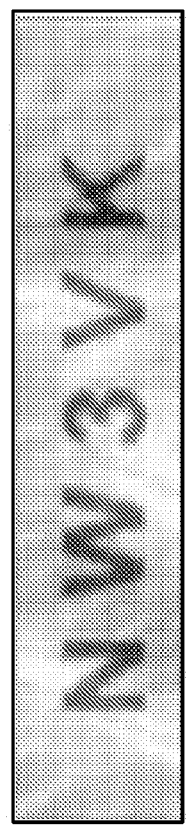
FIGS. 2A-2E illustrates examples of class 1 CAPTCHAs™ displaying a random text strings.
Figure 2B:
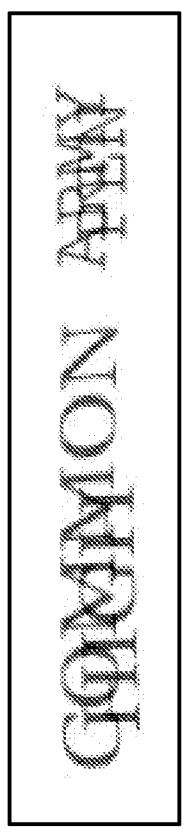
Figure 2C:
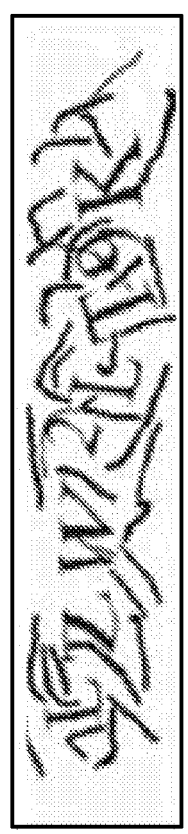
Figure 2D:
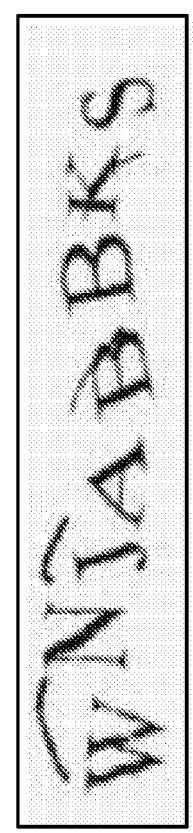
Figure 2E:
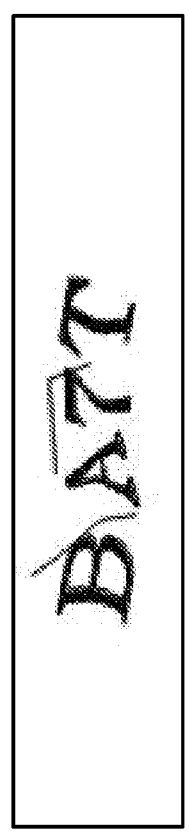

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

As used herein, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and/or thread of execution and a component can be localized on one computer and/or distributed between two or more computers.

Throughout the discussion below, experimental results based on exemplary training sets of data are presented to further support or illustrate various aspects of the subject application. It should be appreciated and understood that such experiments are not intended to limit the scope of the systems and methods described herein to particular scenarios, operating conditions or applications but are provided as examples. Moreover, the subject application can be employed with respect to any type of service performed on the Internet, on a remote or local server, storage facility, or on any computing device or network.

Referring to FIG. 1, there is illustrated a general block diagram HIP system 100 employing partial credit to distinguish between human and non-human users. System 100 includes a Human Interactive Proof (HIP) component 102 that distinguishes between a human and a non-human. HIP component 102 presents one or more challenges to user 108 to determine if user 108 is a human or a computer program. The challenge can be a class I or II CAPTCHA™. For example, a class II CAPTCHA™ challenge can include presenting one or more images to user 108 from data store 104 that user 108 must correctly categorize before being allowed to partially or fully employ computer application 106. Data store 104 can contain any manually categorized data item which the user will have to classify as part of the HIP—images are just one example. Other example data items are sound data items, such as songs or commonly heard sounds (car, airplane, train). For songs the user can be asked to identify the artist, genre, song title or any other attribute of the song. Data store 104 can be a private or public data store that is remotely or locally installed to HIP component 102 or computer application 106. Data store 104 is optional in the case of a class I CAPTCHA™, for example, one that generates random character strings. The discussion that follows employs an example of a free Internet e-mail service as computer application 106 for illustrative purposes. Computer application 106 is not limited to a free e-mail service. Computer application 106 can be any Internet, intranet, or non-networked program that has a need to distinguish between a human an non-human user.

Figure 3:
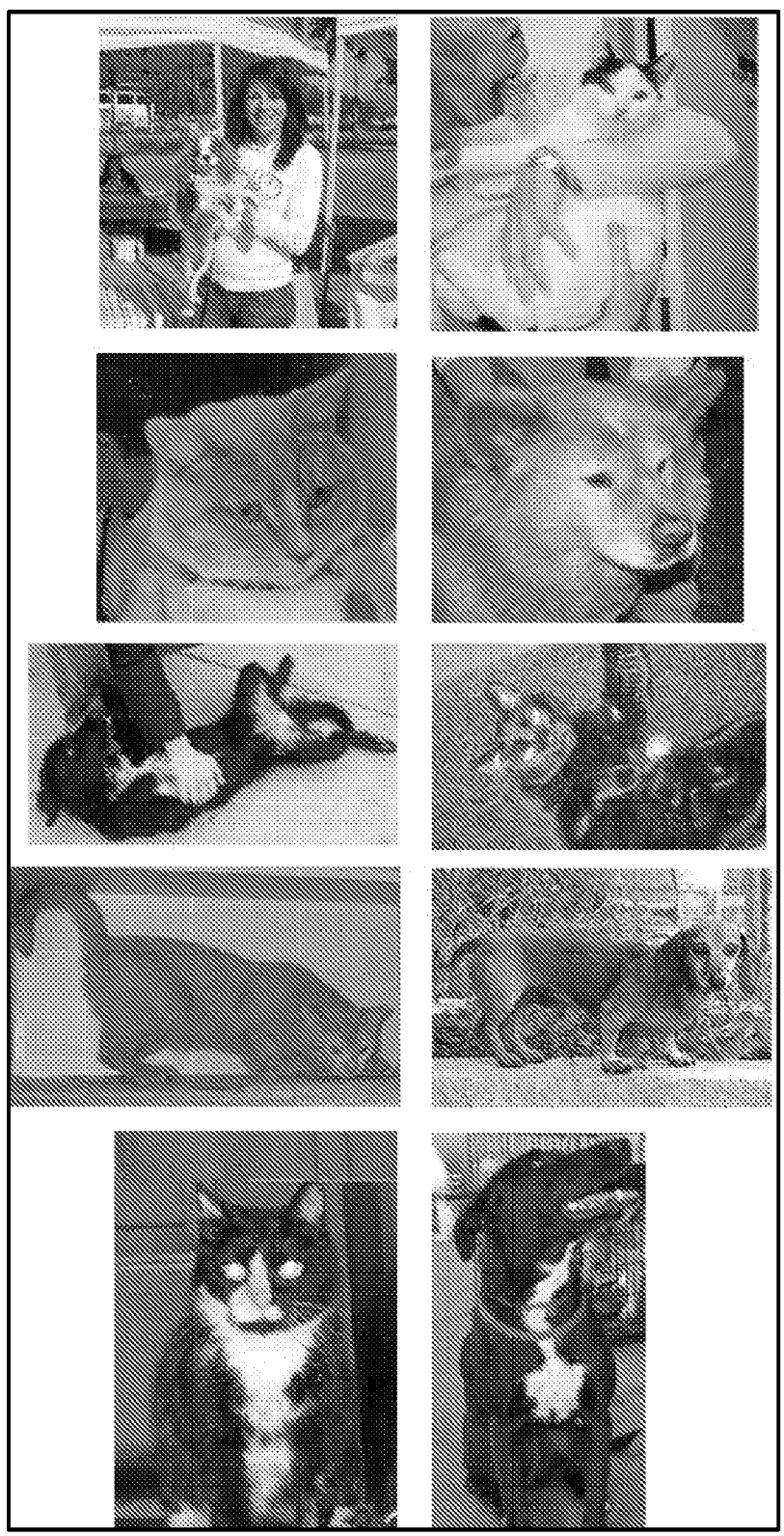
FIG. 3 shows some examples of side by side images of cats and dogs that demonstrate similarities that can cause problems for a machine vision system trying to classify the image as a cat or a dog.

An example data store 104 that is private is owned by Petfinder®. Petfinder® is a web site devoted to finding homes for homeless animals. Petfinder® has a database of over 3 million cat and dog images, each of which is categorized with very high accuracy by human volunteers working in thousands of animal shelters throughout the United States and Canada. Petfinder's® database grows by nearly 10,000 images daily. Humans can readily distinguish a cat from a dog. However, computer algorithms have a much more difficult time distinguishing cats from dogs. Photos have a wide variety of backgrounds, angles, poses, lighting; factors that make accurate automatic classification difficult. FIG. 3 shows some example of side by side images of cats and dogs that demonstrate similarities that can cause problems for a machine vision system trying to tell the difference between a cat and a dog. In some cases, a human may also have difficulty distinguishing an image as being that of a cat or dog.

Figure 4:
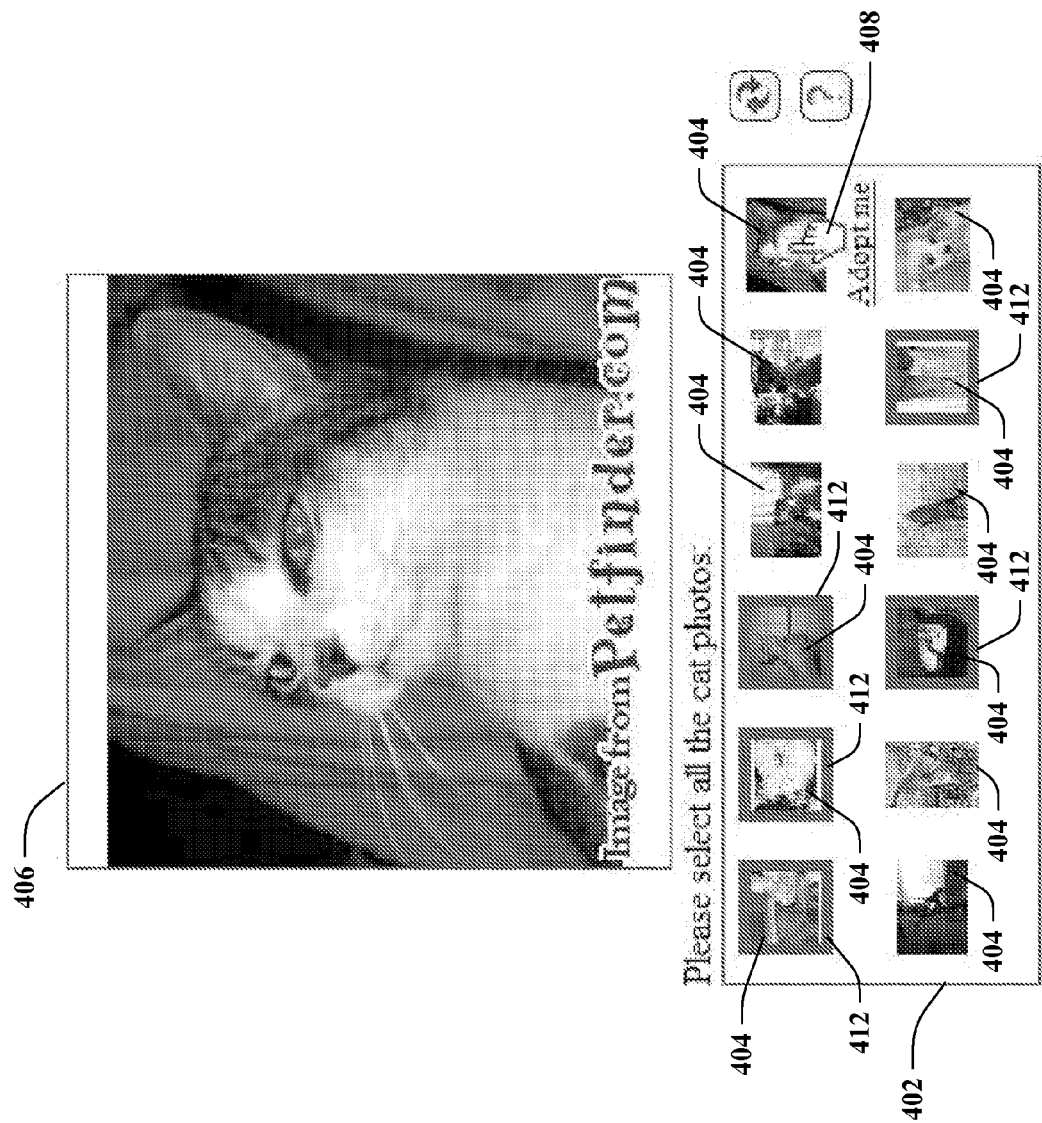
FIG. 4 illustrates an example of HIP challenge displayed to a user consisting of twelve images from the Petfinder® database.

HIP component 102 is called by computer application 106 in order to verify that user 108 is a human. HIP component 102 can be local or remote from computer application 106. For example, HIP component 102 can be a web service that is employable by a plurality of remote web based computer applications 106, such as by calling an API. User 108 can be local or remote to computer application 106. User 108 interacts with computer application 106 in order to gain access to one or more feature of computer application 106. Computer application 106 can at anytime invoke HIP component 102 to determine if user 108 is a human. In the example of a free Internet e-mail service, user 108 may want to establish an e-mail account. Computer application 106 can invoke HIP component 102 before and/or after gathering account information from user 108. HIP component 102 will display a challenge to determine if user 108 is human. The challenge, for example, can consist of displaying one or more images from data store 104 that user 108 must classify. Each image can belong to one of a plurality of classes for which user 108 must classify the image. Any appropriate means to indicating the categorization of an image by user 108 can be employed, such as check boxes, highlighting, borders, fading, etc. For example as depicted in FIG. 4, the challenge can consist of twelve images from the Petfinder® database that user 108 must categorize each as cat or dog. When user 108 places cursor 408 over a pet image 404 in lower box 402, upper box 406 displays a larger image of pet image 404 that the cursor is hovering over. When user 108 selects a pet image 404 a border 412 is placed around the selected pet image 404 to indicate that user 108 has identified this image as a cat. In FIG. 4 for example, five pet images 404 have been selected as cats.

In another aspect, HIP component 102 can optionally employ statistics to prune the data items from data store 104. For example, HIP component 102 can track images that a user 108 incorrectly categorizes and after determining that user 108 is a human, tag those images, such as by a count, as being potentially difficult for a human to correctly categorize. User 108 can be determined to as human, for example, based upon passing a subsequent challenge. The statistics can be tracked over large population of users 108 and images that exceed a threshold can be prevented from being employed by HIP component 102 as part of challenges. The threshold can be, for example, a predetermined count and/or percentage of incorrect attempts versus correct attempts by a human.

After user 108 has made their category selections for the images, user 108 submits the selections to HIP component 102, for example, by selecting a submit button on the display. HIP component 102 then determines if user 108 has correctly categorized the images and makes a determination as to whether user 108 is human or non-human. HIP component 102 can employ a partial credit algorithm (PCA) in making the determination where user 108 is presented with one or more additional HIP challenges that user 108 attempts to solve. The determination can be a binary determination or a percentage indication of the likelihood that the user is a human. For example, a percentage determination can be based upon a statistical difficulty associated with an image that is based upon counts of users determined to be human that incorrectly categorized the image or can be based upon partial credit given by the partial credit algorithm.

The partial credit algorithm can assign an integer, fraction, percentage, or binary partial credit based on user 108 response to the challenge. In the example above of twelve images that user 108 classifies, getting 11 out of 12 correct can result in a 1 image wrong (integer), an $11/12$ (fraction), a 91.67% (percentage), or yes (binary yes/no) partial credit. In another example, a percentage determination can be based upon a statistical difficulty associated with an image that is based upon counts of users determined to be human that incorrectly categorized the image. If 11 out of the 12 images are correctly identified, user 108 gets a challenge almost right and is awarded Partial Credit. If user 108 gets one or more consecutive subsequent challenges almost right while already holding Partial Credit the response is judged as if it were completely correct. Any appropriate means for tracking partial credit can be employed, for example user sessions or user accounts.

PCA can be applied to virtually any CAPTCHA. For example, a text-based CAPTCHA could award partial credit if a single character is typed incorrectly, or if there is an edit distance of 1 between the actual and expected response. Partial credit can be awarded for any number or percentage of incorrect identified characters. Many text-based CAPTCHAs use text strings that are of variable length. In these cases, it may be advantageous to award partial credit based upon a percentage of incorrectly typed characters.

TABLE 1

| Challenges Solved | Users Passed, No PCA | Users Passed, With PCA |
| --- | --- | --- |
| 1 (≈15 sec) | 83.4% | 83.4% |
| 2 (≈30 sec) | 97.2% | 99.6% |
| 3 (≈45 sec) | 99.5% | 99.96% |

PCA employs information that is ignored in the state of the art. This previously-ignored information allows for significantly improving the pass rates for humans while minimally improving the pass rates for automated computer programs. For example, experimentation showed that PCA reduced the number of humans rejected after two challenges from 2.8% to 0.4% (Table 1): a 7-fold reduction in human users failing the challenge. However, the automated computer program yield only improves from $1/4,096$ to $1/3,957$ (Table 2).

TABLE 2

| Image Classifier Accuracy | Pass Rate | |
| --- | --- | --- |
| | No PCA | With PCA |
| 50% | 1/4,096 | 1/3,957 |

In comparison, simply scoring every almost right answer as correct (i.e., passing users who get $11/12$) has a devastating effect on security: an image classifier with a 50% accuracy has a success rate improvement from $1/4,096$ to $1/315$, a 13-fold increase.

Figure 5A:
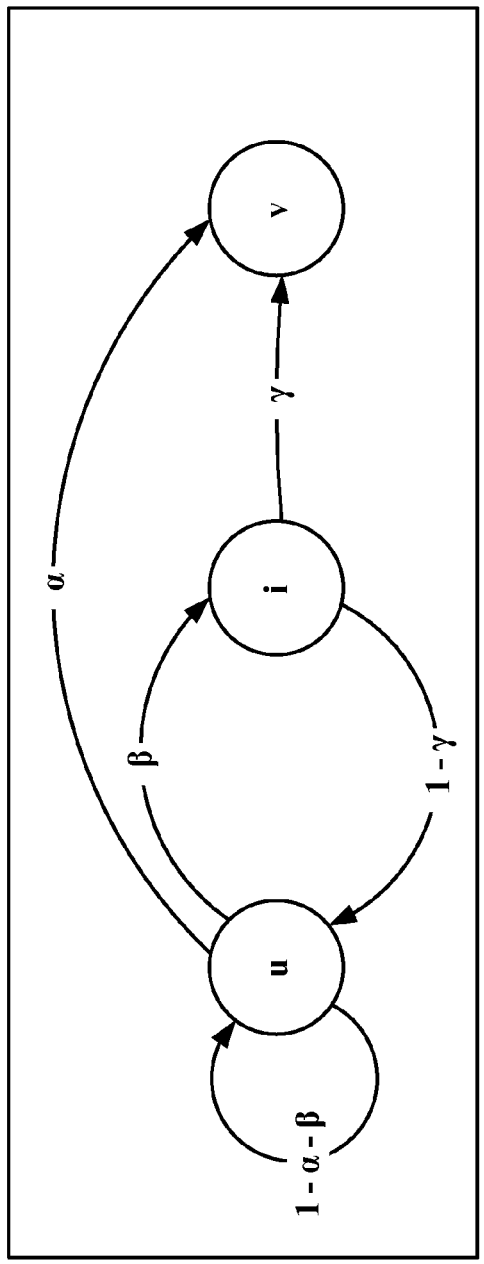
FIG. 5A illustrates a state diagram modeling a partial credit algorithm.

Referring to the state diagram in FIG. 5A, the effect of PCA can be modeled. A new user arrives in the unverified state u, and by solving a challenge the user moves into the verified state v. PCA introduces an intermediate state i, which the user moves into when getting a challenge almost right. From the intermediate state i, if the user solves a sufficient portion of a subsequent challenge correctly, the user moves to the state v; otherwise, the user is returned to state u.

Let α represent the probability of solving a challenge correctly, β be the probability solving enough of the challenge correctly to enter the intermediate state, and γ be the probability of enough of the challenge correct to become verified when in the intermediate state. After n steps, n is an integer, the probability that the user is in each state is given by the following recurrence relation:

$$u_n = (1-\alpha-\beta)u_{n-1} + (1-\gamma)i_{n-1}, u_0=1$$

$$i_n = \beta u_{n-1}, i_0=0$$

$$v_n = v_{n-1} + \alpha u_{n-1} + \gamma i_{n-1}, v_0=0$$

The expected number of trials until verification is:

$$E = \sum_{1<n<\infty} n(v_n - v_{n-1}) = \frac{1+\beta}{\alpha+\beta\gamma}$$

Figure 5B:
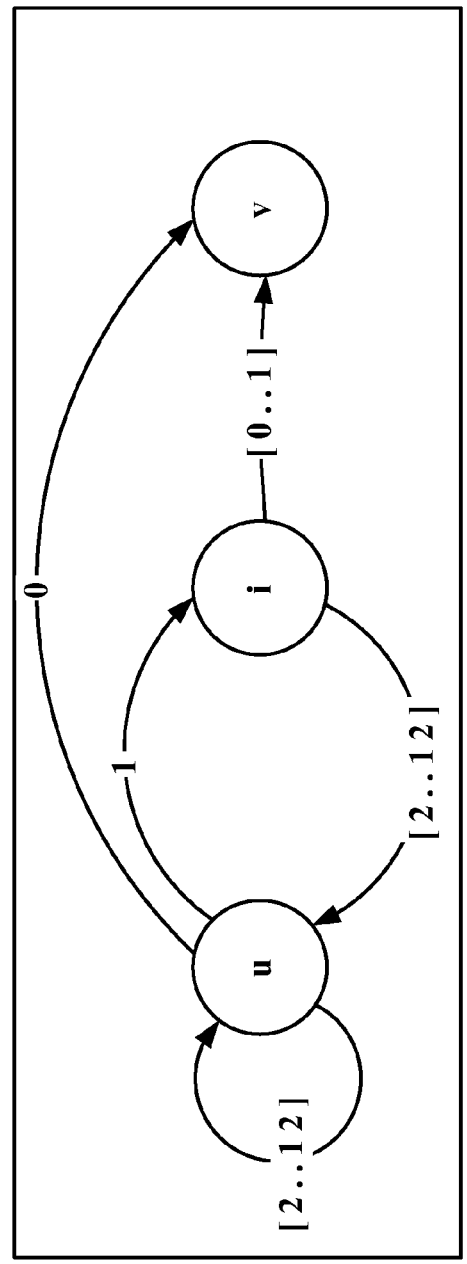
FIG. 5B illustrates an example of a twelve image HIP using the partial algorithm modeled in FIG. 5A.

In an example depicted in FIG. 5B, the number on each line indicates the number of incorrectly classified images by user 108. User 108 moves from unverified (u) state to the intermediate (i) state if exactly one image (out of 12) is misclassified; from the intermediate (i) state, the user moves to the verified (v) state if zero or one image is misclassified. Thus, given a probability p of a user classifying a single image correctly, then using the binomial distribution function b, the PCA probabilities are:

α=b(0;12,1−p)

β=b(1;12,1−p)

γ=b(0;12,1−p)+b(1;12,1−p)

This model can be used to compute the effect of PCA on any CAPTCHA that can define a partial credit solution.

Figure 6A:
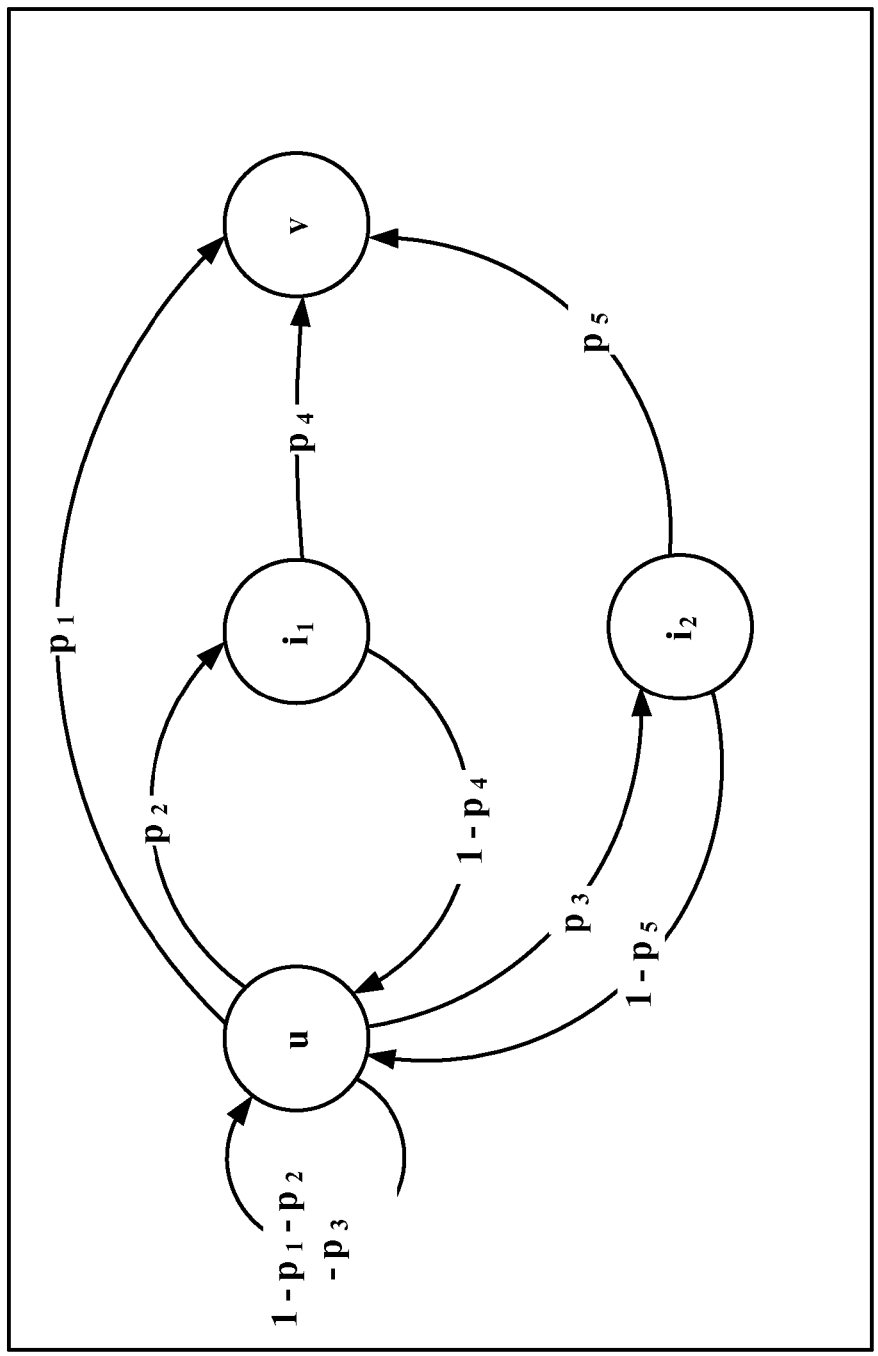
FIG. 6A illustrates a state diagram modeling a partial credit algorithm having more than one intermediate state.

The partial credit algorithm is not limited to a single intermediate state. For example, there can be two or more intermediate states that are in parallel and/or series between the unverified and verified states. In series, an intermediate state can transition to one or more other intermediate state before transitioning to the verified or back to the unverified states. For example as depicted in FIG. 6A, there are two intermediate states $i_1$ and $i_2$ in parallel between the unverified state u and verified state v. The values $p_1$ though $p_5$ represent the probabilities of getting enough of the challenge correct to move from state to state. In this example, $p_1$ represents the probability of getting enough of the challenge correct to move from the state u to state v, $p_2$ represents the probability of getting enough of the challenge correct to move from the state u to state $i_1$, $p_3$ represents the probability of getting enough of the challenge correct to move from the state u to state $i_2$, $p_4$ represents the probability of getting enough of the challenge correct to move from the state $i_1$ to state v, and $p_5$ represents the probability of getting enough of the challenge correct to move from the state $i_2$ to state v. As with the simpler case described with respect to FIG. 5A, the expected number of trials until verification can be calculated using techniques involving recurrence relations; these are well known in the art. The partial credit algorithm can include any number of intermediates states and any transition criteria or threshold for transitioning between states that are appropriate for the type of HIP, type of computer application 106, user 108, or level of desired security. The transition criteria or threshold can be statically determined or dynamically determined. For example, advances in machine vision systems might allow an automated system to correctly classify images with accuracy of 70% or higher. Assuming a hypothetical CAPTCHA that requires 12 images to be correctly without the Partial Credit Algorithm (about a 1/72 probability) we can use the above computations to determine that the Partial Credit Algorithm improves the machine vision's chances to about 1/27. If such a machine vision system becomes commonplace, our computations indicate that, with or without PCA, the number of images in the challenge should be increased.

Figure 6B:
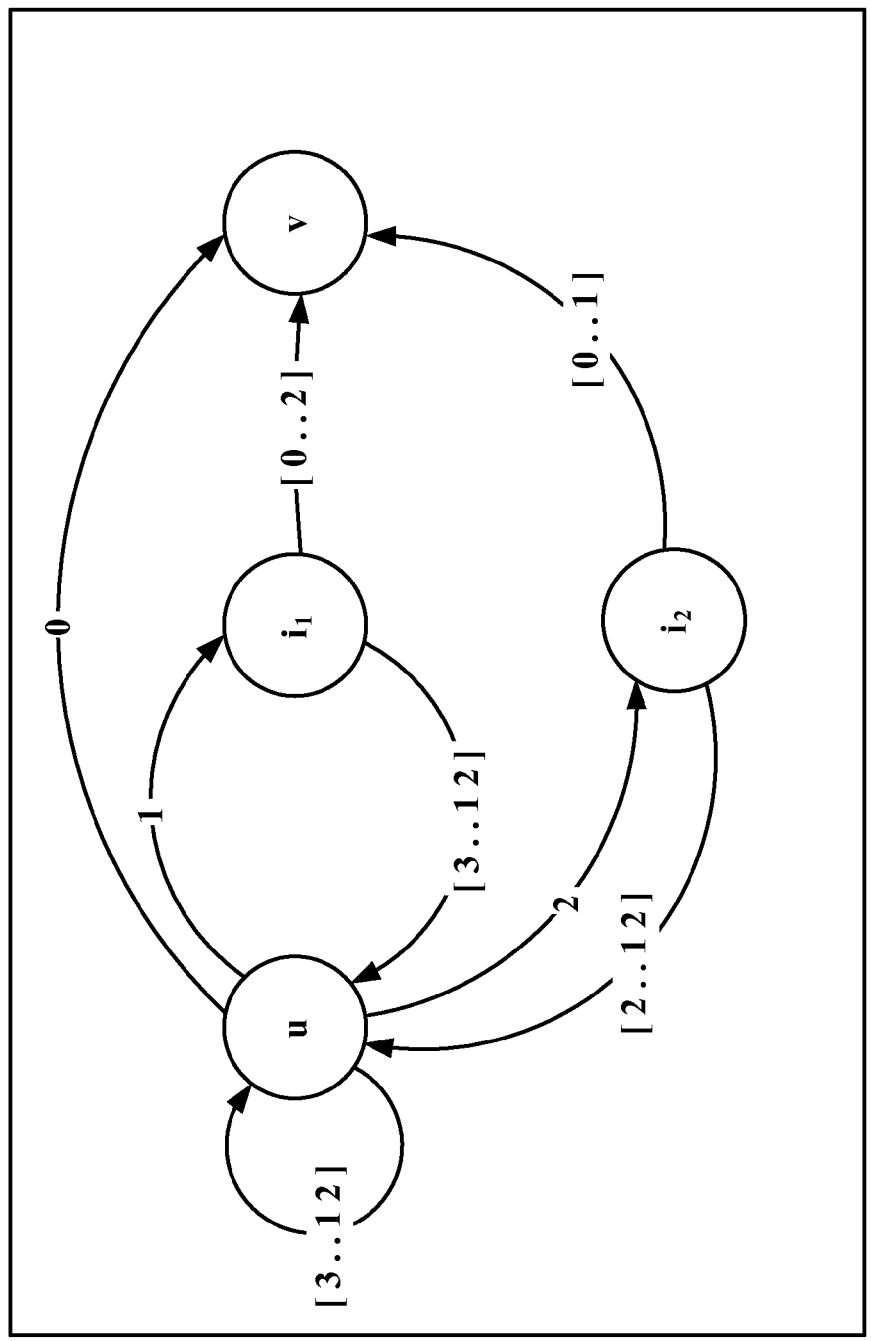
FIG. 6B illustrates an example of a twelve image HIP using the partial algorithm modeled in FIG. 6A.

FIG. 6B depicts an example of multiple intermediate states using the twelve image HIP challenge describe above. User 108 moves from unverified (u) state to the intermediate ($i_1$) state if exactly one image (out of 12) is misclassified; from the intermediate ($i_1$) state, the user moves to the verified (v) state if zero, one, or two images are misclassified. User 108 moves from unverified (u) state to the intermediate ($i_2$) state if two images (out of 12) are misclassified; from the intermediate ($i_2$) state, the user moves to the verified (v) state if zero or one image is misclassified.

HIP component 102 notifies computer application 106 of the determination. Computer application 106 can then employ the determination in assessing whether access should be provided to user 108. For example, if the determination is that user 108 is human then access to features of computer application can be granted to user 108. If the determination is that user 108 is non-human access can be denied by computer application 106. If the determination is in the form of percentage likelihood that user 108 is human, computer application 106 can employs the percentage with an algorithm based on the level of security desired to grant or restrict access. For example, if computer application is willing to trade-off a little security in order to let more potentially real humans gain access, then the algorithm may grant access as long as the percentage is above a predetermined threshold.

Figure 7:
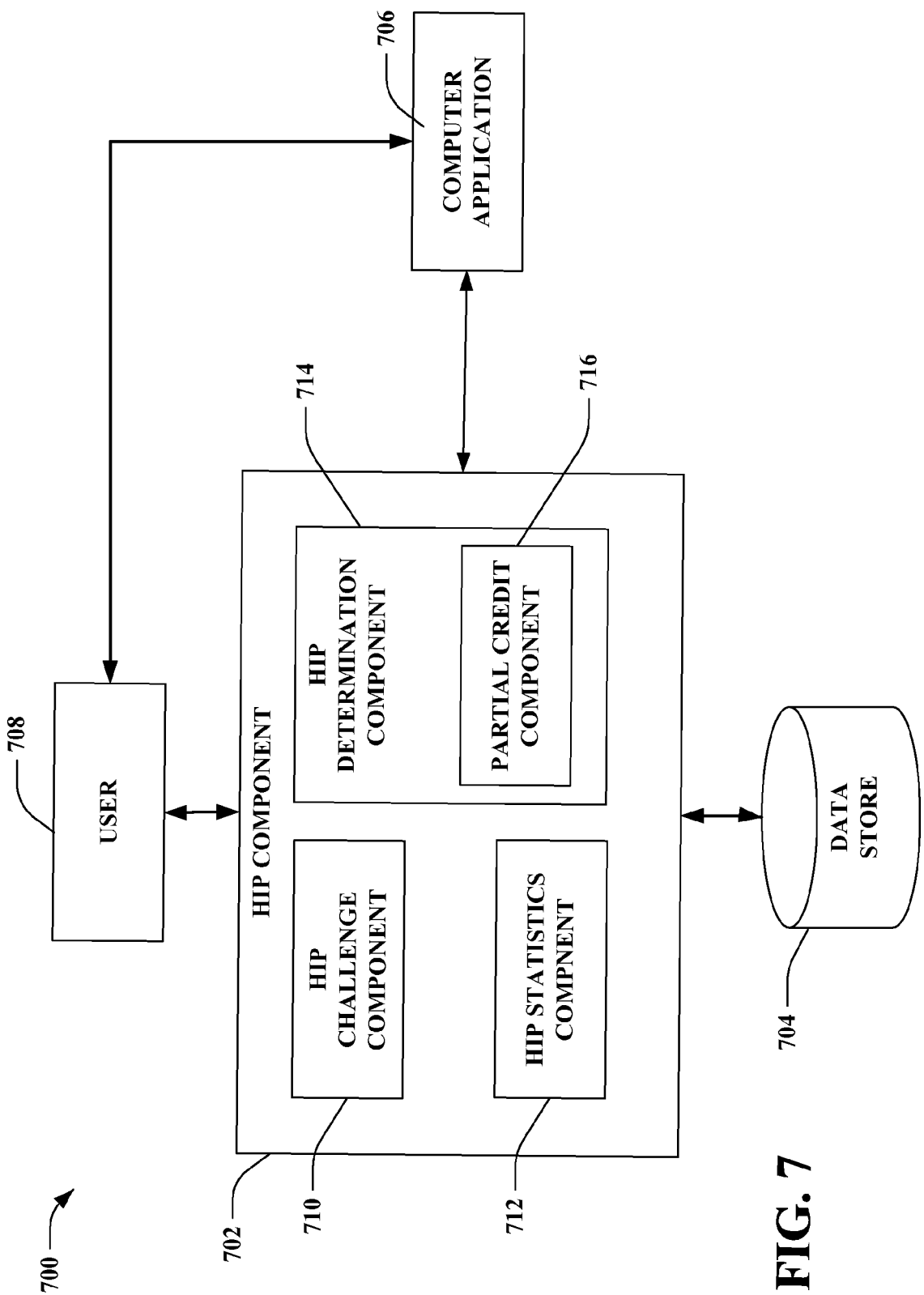
FIG. 7 illustrates a general block diagram HIP system employing partial credit to distinguish between human and non-human users.

Referring to FIG. 7, there is illustrated a general block diagram HIP system 700 employing partial credit to distinguish between human and non-human users. System 700 includes a Human Interactive Proof (HIP) component 702 that distinguishes between a human and a non-human. HIP component 702 presents one or more challenges, such as class I or II CAPTCHAs™, to user 708 to determine if user 708 is a human or a non-human user. The challenges can include, for example, presenting one or more images to user 708 from data store 704 that user 708 must correctly categorize before being allowed to partially or fully employ computer application 706. Data store 704 can contain a large number of images that have been substantially accurately manually categorized by one or more humans.

HIP component 702 is called by computer application 706 in order to verify that user 708 is a human. HIP component 702 can be local or remote from computer application 706. User 708 interacts with computer application 706 in order to gain access to one or more feature of computer application 706. Computer application 706 can at anytime invoke HIP component 702 to determine if user 708 is a human. HIP challenge component 710 will present a challenge to user 708 determine if user 708 is human.

In yet another aspect, HIP statistics component 712 can optionally employ statistics to prune the selectable images from private data store 704. For example, HIP statistics component 712 can track images that a user 708 incorrectly categorizes and after determining that user 708 is a human, tag those images, such as by a count, as being potentially difficult for a human to correctly categorize. The statistics can be tracked over large population of users 708 and images that exceed a threshold can be prevented from being employed by HIP challenge component 710 as part of challenges. The threshold can be, for example, a predetermined count and/or percentage of incorrect attempts versus correct attempts by a human.

After user 708 has made their category selections for the images, user 708 submits the selections to HIP component 702, for example, by selecting a submit button on the display. HIP determination component 714 then determines which portions of user 708 response to the challenge are correct and incorrect. HIP determination component 714 can employ partial credit component 716 when user 708 gets any portion of the challenge incorrect. Partial credit component 716 can employ a partial credit algorithm to determine if user 708 should get partial credit for their answer. When partial credit is given to user 708, the partial credit can be tracked for user 708 by partial credit component 716 and one or more subsequent challenges can be presented to user 708 by HIP challenge component 710. Correctness of user 708 response to these one or more challenges can be provided to partial credit component 716 so HIP determination component 714 can determine if user 708 is human or non-human. HIP determination component 714 notifies computer application 706 of the determination. The determination can be a binary determination or a percentage indication of the likelihood that the user is a human. For example, a percentage determination can be based upon a statistical difficulty assigned to an image by HIP statistics component 712 that is based upon counts of users determined to be human that incorrectly categorized the image. Computer application 706 can then employ the determination in assessing whether access should be provided to user 708.

In view of the exemplary systems shown and described supra, methodologies that may be implemented in accordance with the disclosed subject matter will be better appreciated with reference to the flow charts described below. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

Figure 8:
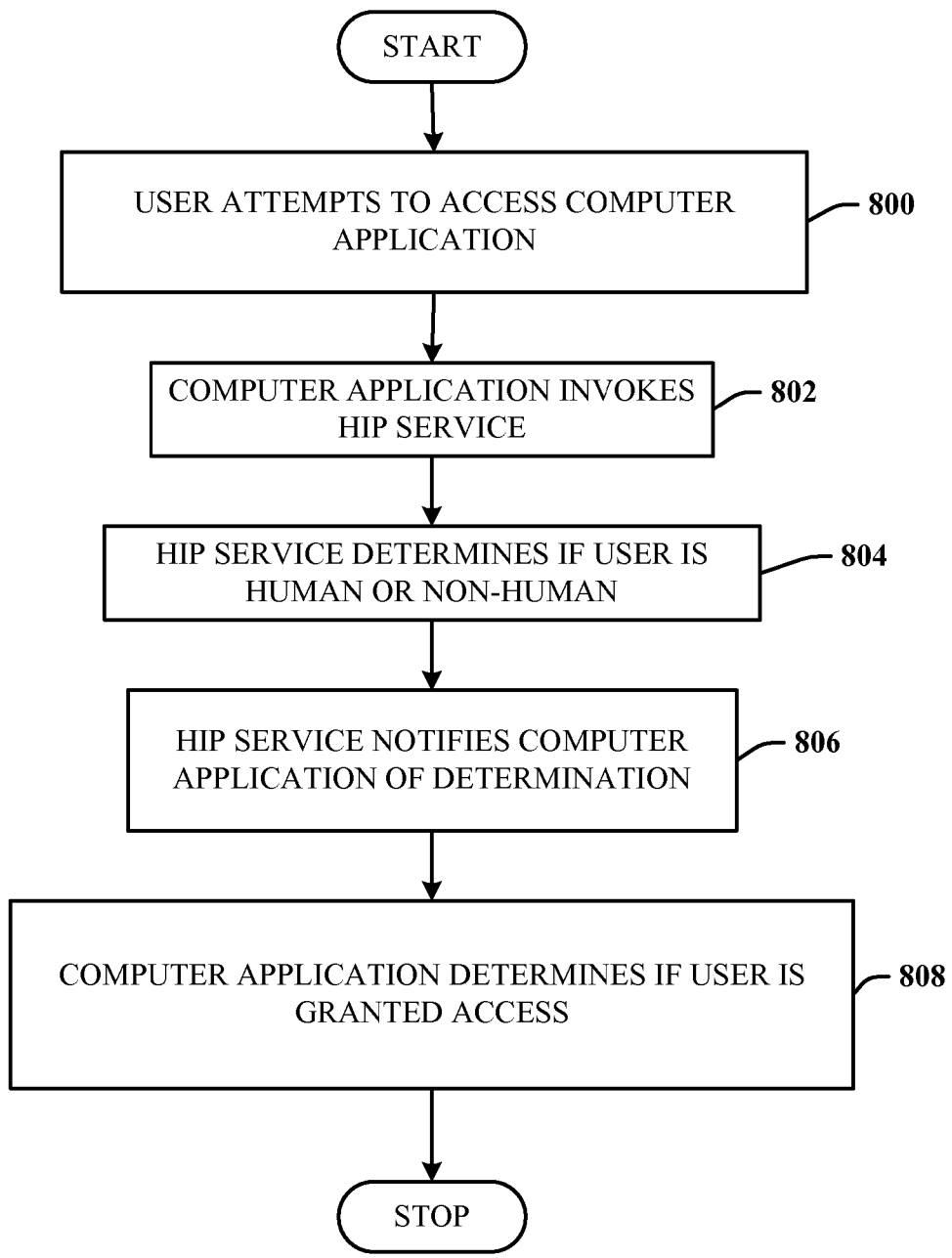
FIG. 8 illustrates a flow chart of one methodology for a computer application to employ a HIP service that utilizes partial credit to distinguish between a human and non-human user taking a HIP challenge.

Referring now to FIG. 8 there is illustrated a flow chart of one methodology for a computer application to employ a HIP service that utilizes partial credit to distinguish between a human and non-human user taking a HIP challenge. At 800 a user attempts to access a computer application. At 802 the computer application invokes a HIP service. At 804, the HIP service determines if the user is a human or non-human. At 806, the HIP service notifies the computer application of the determination. At 808, the computer application employs the determination from the HIP service to decide if the user will be granted access to features of the computer application.

Figure 9:
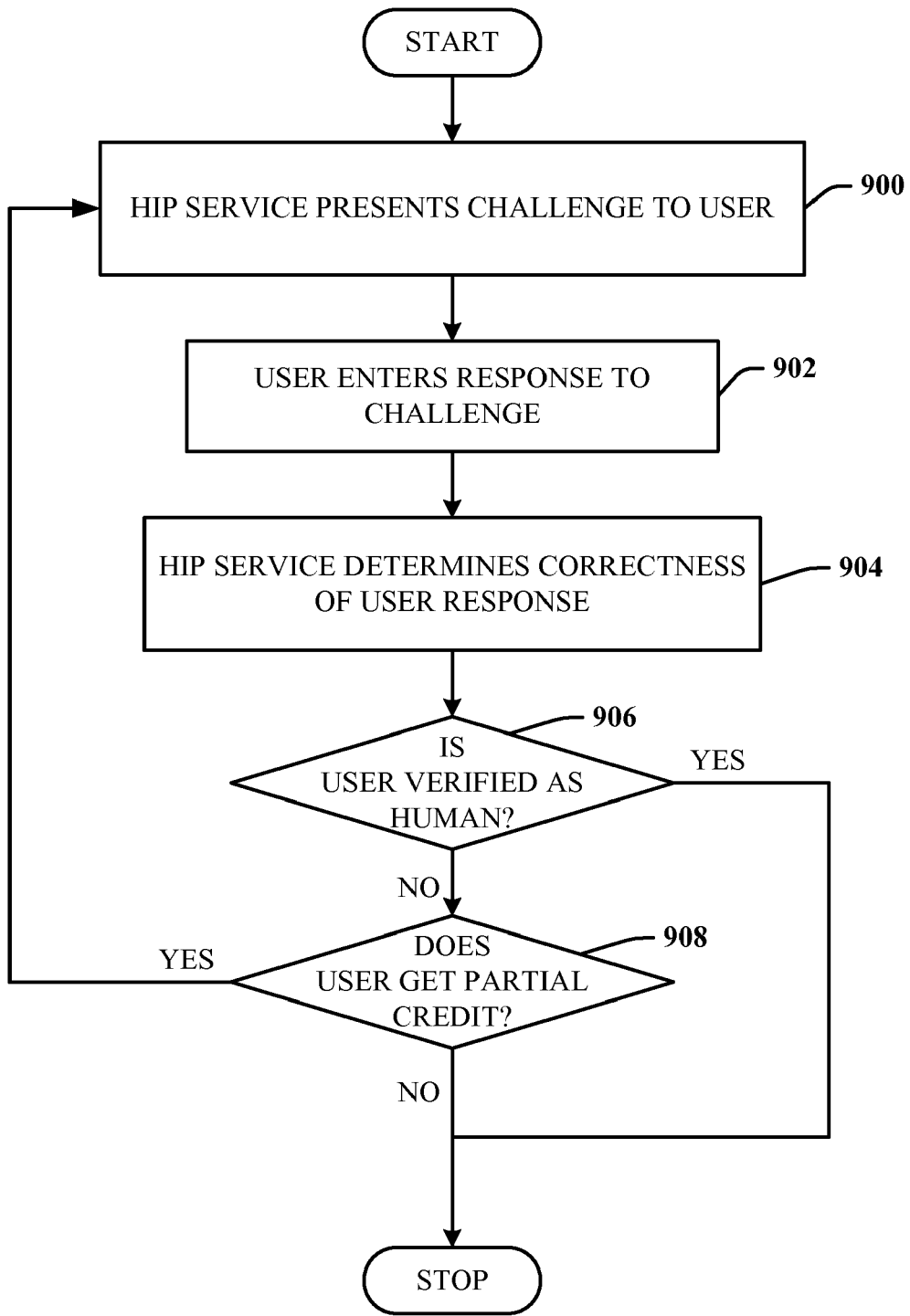
FIG. 9 illustrates a flow chart of one methodology for a HIP service to employ partial credit to distinguish between a human and non-human user taking the HIP challenge.

Referring to FIG. 9 there is illustrated a flow chart of one methodology for a HIP service to employ partial credit to distinguish between a human and non-human user taking the HIP challenge. At 900 HIP service presents a HIP challenge to a user. At 902, the user enters their response to the HIP challenge to the HIP service. At 904, the HIP service makes a determination as to the correctness of the user's response and proceeds to 906. At, 906, HIP service determines if the correctness along with any previously saved partial credit for the user indicates a human user. If it is determined that the user is human the method ends. If it is not determined that the user is human, the method proceeds to 908. At 908, it is determined if the user gets partial credit for their response. If the user does not get partial credit, then it is determined that the user is not human. If the user gets partial credit, the partial credit is tracked for the user by any appropriate means and the method proceeds to 900.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
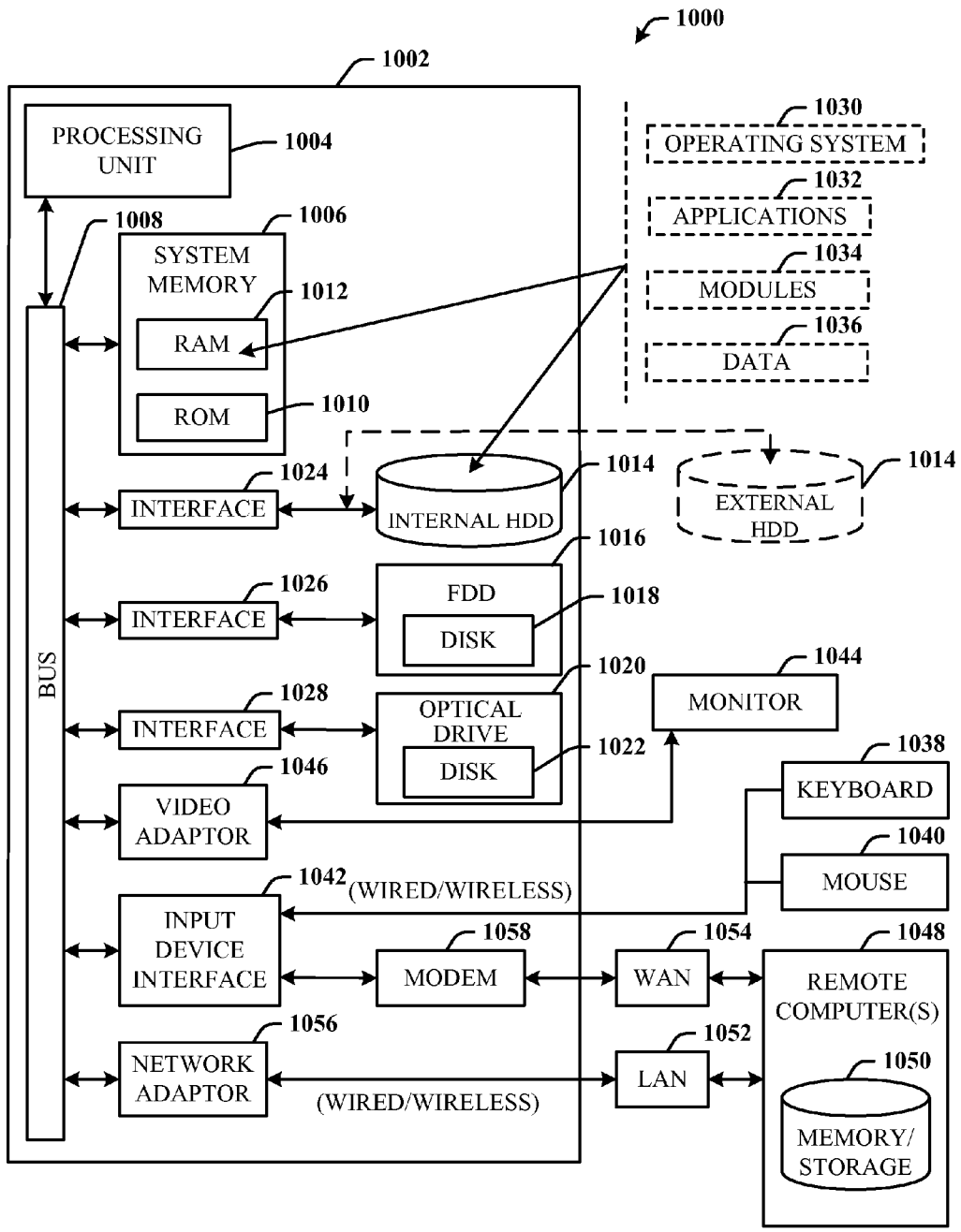
FIG. 10 illustrates a block diagram of a computer operable to execute the disclosed HIP service.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 11:
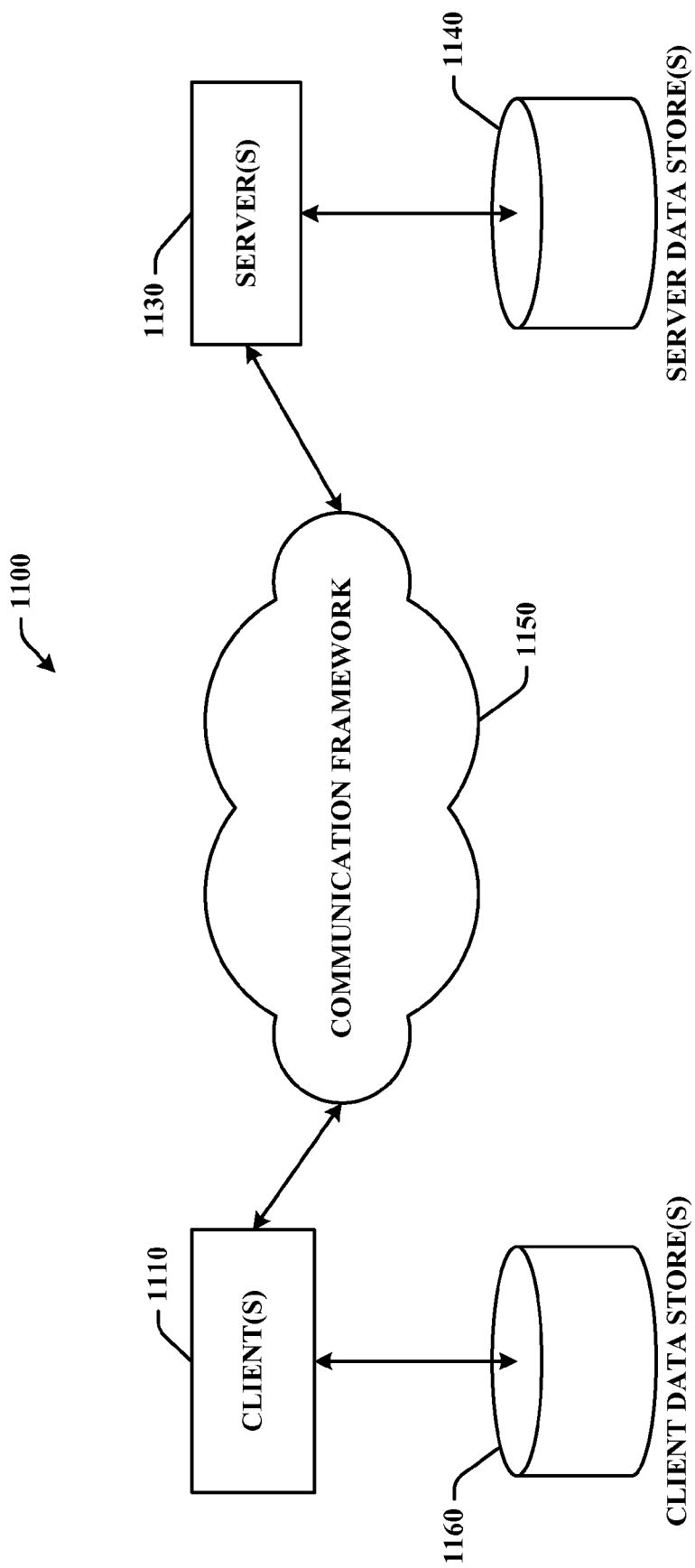
FIG. 11 illustrates a schematic block diagram of an exemplary computing environment for implementing a HIP service in accordance with another aspect.

Referring now to FIG. 11, there is illustrated a schematic block diagram of an exemplary computing environment 1100 for processing the inference-based query completion architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for determining whether input is from a machine or from a human user, the computer-implemented system comprising memory and a processor, and further comprising:
   a human interactive proof (HIP) challenge component that presents a HIP challenge, where the challenge is stored in the memory; and
   a HIP determination component executed by the processor that employs a partial credit algorithm to determine that a responder to whom the HIP challenge is conveyed is a human or non-human based, at least, on a response to the challenge provided as input by the responder, where the response is stored in the memory, the partial credit algorithm including a determination that a plurality of songs are categorized in a correct genre of a plurality of genres based on one or more of the plurality of songs being previously determined to have a likelihood of correct categorization being less than a predetermined value, and is configured to assign the responder partial credit for correct categorization of one or more of the plurality of songs, and a value of the partial credit in the memory is indicative of whether the responder is a human or a non-human.

2. The computer-implemented system of claim 1, wherein the value of the partial credit is at least one of an integer or a fraction.

3. The computer-implemented system of claim 1, wherein the HIP determination component is further configured to track partial credit for the responder through a plurality of challenges.

4. The computer-implemented system of claim 1, wherein a HIP challenge component is configured to display a subsequent challenge upon assignment of partial credit to the responder.

5. The computer-implemented system of claim 4, wherein the HIP determination component is further configured to move the responder from an unverified as human state to an intermediate state based, at least, on determining that the responder has a predetermined portion of the HIP challenge incorrect or correct.

6. The computer-implemented system of claim 5, wherein the intermediate state is one of a plurality of intermediate states.

7. The computer-implemented system of claim 1, wherein the HIP determination component is further configured to move the responder from an intermediate state to a verified as human state based, at least, on determining that the responder has a predetermined portion of the HIP challenge incorrect or correct.

8. The computer-implemented system of claim 7, wherein the HIP determination component moves the responder from the intermediate state to another intermediate state based, at least, on determining that the responder has a predetermined portion of the HIP challenge incorrect or correct.

9. The computer-implemented system of claim 5, wherein the HIP determination component is further configured to move the responder from an intermediate state to an unverified as human state based, at least, on determining that the responder has a predetermined portion of the challenge incorrect or correct.

10. The computer-implemented system of claim 1, wherein the HIP determination component is further configured to employ a responder session to track partial credit given to the responder.

11. A computer-implemented method of distinguishing between a human and non-human responder, the computer-implemented method performed by one or more processors and storage, the method comprising:
conveying a human interactive proof (HIP) challenge from the storage;
determining, by the one or more processors, that the responder to whom the HIP challenge is conveyed is a human or a non-human based, at least, on a response to the challenge provided by the responder and a partial credit algorithm, the response stored in the storage, the partial credit algorithm includes assigning the responder partial credit for correctly identifying at least one of an artist name, genre or title associated with one or more songs, of the HIP challenge and getting a portion of the HIP challenge correct, a value of the partial credit being indicative of whether the responder is a human or a non-human; and
tracking, by the one or more processors, at least one of the songs included in the HIP challenge that the responder incorrectly categorizes.

12. The computer-implemented method of claim 11, the value of the partial credit being at least one of an integer, a fraction, a percentage or a binary value.

13. The computer-implemented method of claim 11, further comprising tracking partial credit for the responder during a plurality of challenges.

14. The computer-implemented method of claim 11, further comprising displaying a subsequent challenge upon assignment of partial credit to the responder.

15. The computer-implemented method of claim 14, further comprising moving the responder from an unverified as human state to an intermediate state upon determining that the responder has gotten a predetermined portion of the HIP challenge incorrect or correct.

16. The computer-implemented method of claim 15, wherein the intermediate state is one of a plurality of intermediate states.

17. The computer-implemented method of claim 11, moving the responder from an intermediate state to a verified as human state based, at least, on determining that the responder has a predetermined portion of the challenge incorrect or correct.

18. The computer-implemented method of claim 17, moving the responder from an intermediate state to another intermediate state based, at least, on determining that the responder has a predetermined portion of the challenge incorrect or correct.

19. The computer-implemented method of claim 15, moving the responder from an intermediate state to a unverified as human state based, at least, on determining that the responder has a predetermined portion of the challenge incorrect or correct.

20. One or more computer storage media, wherein the one or more computer storage media is not a signal, the one or more computer storage media having instructions stored thereon that, when executed by a processor, cause operations to be performed comprising:
displaying a human interactive proof (HIP) challenge;
determining that a responder to whom the HIP challenge is conveyed is a human or a non-human based, at least, on a response to the HIP challenge provided by the responder and including a categorization of one or more songs into one or more genres, and a partial credit algorithm that includes assigning the responder partial credit for getting a portion of the HIP challenge correct based on at least one of the one or more of songs being previously determined to have a likelihood of correct categorization being less than a predetermined value, a value of the partial credit being indicative of whether the responder is a human or a non-human.

21. The computer-implemented method of claim 11, further comprising:
tagging the songs included in the HIP challenge that the responder incorrectly categorizes as being difficult for a human to correctly categorize.

22. The computer-implemented system of claim 1, the value of the partial credit being at least one of a percentage or a binary value.

23. The computer-implemented method of claim 21, further comprising denying inclusion in subsequent HIP challenges to images that are incorrectly categorized more than a predetermined number of times.

* * * * *